United States Patent
Slane et al.

(10) Patent No.: US 11,919,648 B2
(45) Date of Patent: Mar. 5, 2024

(54) Z-CNT FILLED MELTABLE ADHESIVES FOR BONDING OF DEICERS

(71) Applicant: Goodrich Corporation, Charlotte, NC (US)

(72) Inventors: Casey Slane, Tallmadge, OH (US); Peter J. Walsh, Wethersfield, CT (US); Jin Hu, Hudson, OH (US); Nathaniel Ching, Hartville, OH (US)

(73) Assignee: GOODRICH CORPORATION, Charlotte, NC (US)

( * ) Notice: Subject to any disclaimer, the term of this patent is extended or adjusted under 35 U.S.C. 154(b) by 0 days.

(21) Appl. No.: 18/059,745

(22) Filed: Nov. 29, 2022

(65) Prior Publication Data

US 2023/0121788 A1   Apr. 20, 2023

Related U.S. Application Data

(62) Division of application No. 16/578,731, filed on Sep. 23, 2019, now Pat. No. 11,542,019.

(60) Provisional application No. 62/886,005, filed on Aug. 13, 2019, provisional application No. 62/780,314, filed on Dec. 16, 2018.

(51) Int. Cl.
*B64D 15/12* (2006.01)
*C08K 3/04* (2006.01)
*C09J 7/38* (2018.01)
*C09J 9/02* (2006.01)
*C09J 125/06* (2006.01)
*C09J 183/04* (2006.01)
*B82Y 30/00* (2011.01)
*B82Y 40/00* (2011.01)

(52) U.S. Cl.
CPC ............ *B64D 15/12* (2013.01); *C08K 3/041* (2017.05); *C09J 7/385* (2018.01); *C09J 9/02* (2013.01); *C09J 125/06* (2013.01); *C09J 183/04* (2013.01); *B82Y 30/00* (2013.01); *B82Y 40/00* (2013.01)

(58) Field of Classification Search
CPC ........ B64D 15/12; B64D 15/00; B64D 15/06; B64D 15/02; C08K 3/041; C09J 7/385; C09J 9/02; C09J 125/06; C09J 183/04; C09J 125/08; C09J 125/12; C09J 125/14; C09J 11/04; B82Y 30/00; B82Y 40/00
USPC .......... 244/134, 134 R, 134 C, 134 E; 252/70
See application file for complete search history.

(56) References Cited

U.S. PATENT DOCUMENTS

| | | | |
|---|---|---|---|
| 8,283,612 B2 | 10/2012 | Keite-Telgenbuescher et al. | |
| 8,664,573 B2 | 3/2014 | Shah et al. | |
| 9,468,043 B2 | 10/2016 | Heintz et al. | |
| 10,023,702 B2 | 7/2018 | Baker et al. | |
| 2005/0062024 A1 | 3/2005 | Bessette et al. | |
| 2010/0316845 A1* | 12/2010 | Rule | C09J 7/24 156/60 |
| 2013/0276973 A1* | 10/2013 | Rule | H05B 3/36 156/60 |
| 2014/0034633 A1* | 2/2014 | Heintz | H01C 17/065 219/525 |
| 2016/0340482 A1 | 11/2016 | Williams et al. | |
| 2016/0347458 A1 | 12/2016 | Hu | |
| 2017/0136694 A1* | 5/2017 | Rezai | B33Y 30/00 |
| 2018/0160481 A1 | 6/2018 | Botura et al. | |
| 2018/0194109 A1 | 7/2018 | Lima et al. | |
| 2018/0344588 A1* | 12/2018 | Vogel | A45D 31/00 |
| 2019/0292420 A1* | 9/2019 | Hu | C09J 7/385 |

FOREIGN PATENT DOCUMENTS

| | | |
|---|---|---|
| EP | 3543138 A1 | 9/2019 |
| JP | 6150840 B2 | 6/2017 |
| WO | 2015185367 A1 | 12/2015 |

OTHER PUBLICATIONS

Claims in U.S. Appl. No. 15/928,671, filed Mar. 14, 2022. (Year: 2022).
Extended European Search Report for EP Application No. 19216559.5, dated May 4, 2020, pp. 7.

* cited by examiner

*Primary Examiner* — Douglas J McGinty
(74) *Attorney, Agent, or Firm* — Kinney & Lange, P. A.

(57) ABSTRACT

A method of making an adhesive for an ice protection assembly includes transferring Z-CNTs from a substrate carrier into the adhesive. De-bonding of the adhesive for ice protection assembly inspection or repair or repositioning at initial installation includes heating the Z-CNTs in the adhesive to soften the adhesive and allow for easy removal.

20 Claims, 3 Drawing Sheets

Z-CNT FILLED MELTABLE ADHESIVES FOR BONDING OF DEICERS

CROSS-REFERENCE TO RELATED APPLICATION(S)

This application is a divisional of U.S. patent application Ser. No. 16/578,731 filed Sep. 23, 2019 for "Z-CNT FILLED MELTABLE ADHESIVES FOR BONDING OF DEICERS" by C. Slane, P. J. Walsh, J. Hu and N. Ching which claims the benefit of U.S. Provisional Application No. 62/886,005 filed Aug. 13, 2019 for "Z-CNT FILLED MELTABLE ADHESIVES FOR BONDING OF DEICERS" by C. Slane, P. J. Walsh, J. Hu and N. Ching which in turn claims the benefit of U.S. Provisional Application No. 62/780,314 filed Dec. 16, 2018 for "Z-CNT FILLED MELTABLE ADHESIVES FOR BONDING OF DEICERS" by C. Slane, P. J. Walsh, J. Hu and N. Ching, the disclosures of which are incorporated by reference into this application in their entireties.

BACKGROUND

This application relates generally to ice protection assemblies, and specifically to ice protection assembly adhesives.

An aircraft moving through the air is often subjected to ice formation, and anti-icing or de-icing devices must be used to remove or prevent ice from accumulating on exterior surfaces of the aircraft. Ice protection assemblies, such as pneumatic and electrothermal elastomeric ice protection devices, are often attached to wing leading edges or other aircraft components with adhesive.

Both pneumatic and electrothermal elastomeric ice protection devices may be removed and re-applied during the lifetime of the part on which they prevent ice formation or repositioned if initial application on the surfaces is not aligned properly. Typically, ice protection devices are attached to aircraft component with chemical adhesives that require extensive preparation, application, and drying time. De-bonding these chemical adhesives, or pressure sensitive adhesives used to secure ice protection devices to aircraft components for reapplying or repositioning ice protection assembly, is time consuming and can damage the ice protection device. Additionally, traditional "fast application" or "quick removal" adhesives lack the strength necessary to secure an ice protection device to an aircraft component surface.

SUMMARY

In one embodiment, an ice protection assembly includes an aircraft component having a surface, an adhesive on the surface of the aircraft component, wherein the adhesive is loaded with vertically aligned carbon nanotubes (Z-CNTs), and a heater attached to the aircraft component by the adhesive.

In a second embodiment, a method of preparing an adhesive comprising infiltrating the adhesive with vertically aligned carbon nanotubes (Z-CNTs).

In a third embodiment, a method of removing an adhesive from a component includes electrically connecting the adhesive to a power source, running voltage through the adhesive so that Z-CNTs in the adhesive heat and soften the adhesive, and removing the softened adhesive.

DETAILED DESCRIPTION

Disclosed is an adhesive loaded with vertically aligned carbon nanotubes (Z-CNTs) that allow for easier de-bonding of that adhesive between an ice protection assembly and an aircraft component. An adhesive loaded with electrically conductive nanoparticles, such as Z-CNTs, will soften or melt when electrically connected to a power source. Z-CNTs can be readily loaded into thermoplastic adhesives including pressure sensitive adhesives (PSA), which can in turn be used to attach ice protection devices to aircraft components. The use of Z-CNTs in an adhesive also enhances the strength of the adhesive bond between the ice protection assembly and the aircraft component, allowing lower strength materials to be used for the adhesive.

Figure 1:
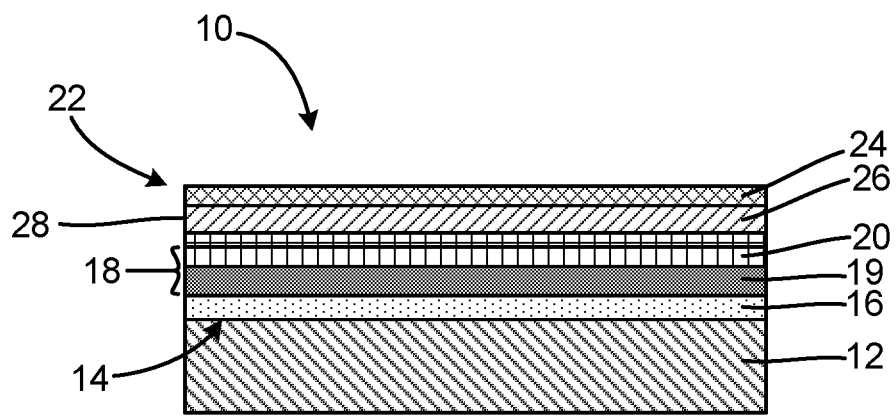
FIG. 1 is a schematic diagram of an ice protection assembly attached to an aircraft component with a Z-CNT loaded pressure sensitive adhesive.

FIG. 1 is a schematic diagram of ice protection assembly 10 attached to an aircraft component 12 with a Z-CNT loaded pressure sensitive adhesive Assembly 10 includes aircraft component 12 with surface 14, primer 16, Z-CNT loaded adhesive 18 (with pressure sensitive adhesive 19 and Z-CNTs 20), and heater 22. Heater 22 includes structural layers 24, heating element 26, and electrical connections 28.

Aircraft component 12 with surface 14 is a component needing ice protection. Component 12 can be, for example, an airfoil, nacelle, nosecone, engine cowl, propeller, or other aircraft part. Surface 14 is the surface that requires ice protection, on which the ice protection assembly is attached through Z-CNT loaded adhesive 18.

Z-CNT loaded adhesive 18 has two components: pressure sensitive adhesive (PSA) 19 and Z-CNTs 20. PSA 19 is an adhesive which forms a bond when pressure is applied to the adhesive and the components it is adhering. Pressure sensitive adhesives are frequently used to adhere ice protection devices to aircraft components, and typically have a thickness in the range of about 10 mils. One examples of a suitable material is pn VHB 9473 by 3M. PSA 19 can be any e acrylate, silicone, nitrile, and/or styrenes based adhesive.

With PSA 19, the strength of the adhesive bond depends on the amount of pressure applied to the adhesive surface. Factors affecting surface 14 affect the strength of adhesion. For instance, smoothness, surface energy, removal of contaminants, and other factors affect proper adhesion. For this reason, a primer 16 can be coated on surface 14 of component 12 to prepare surface 14 for application of Z-CNT loaded adhesive 18. Primer 16 promotes adhesion between component surface 14 and PSA 19. Primer 16 can be, for example, pn 94 available from 3M®. Primer 16 is applied evenly throughout component surface 14, and can be applied by spraying, painting, wiping, or other appropriate methods.

PSA 19 is "loaded" with Z-CNTs. Carbon nanotubes (CNTs) are carbon allotropes having a generally cylindrical nanostructure. They have unusual properties that make them valuable for many different technologies. For instance, some CNTs can have high thermal and electrical conductivity, in addition to good mechanical properties, making them suitable heating elements. Additionally, CNTs have a low density or weight making them ideal for a wide variety of aerospace applications.

Z-CNTs, or vertically aligned carbon nanotubes, have a unique microstructure of CNTs oriented along their longitudinal axes normal to a substrate surface. Z-CNTs effectively increase anisotropic properties of CNT layers, networks, or arrays. When added to a structure, Z-CNTs can conform around pre-existing layers without disturbing the bulk material, strengthening the composite interface and delaying cracking or breakage. Also, addition of Z-CNTs to a composite does not substantially change the overall thickness of that composite. For example, if a standard 0.10" PSA layer is used as an adhesive, the addition of Z-CNTs would not alter that thickness.

Addition of Z-CNTs to a thermoplastic adhesive or PSA fortifies the structure of the adhesive, allowing for stronger adhesion between surfaces and shorted readiness times for operation as discussed with reference to FIG. 2. The addition of Z-CNTs reinforces the adhesive bond strength, allowing for less wait time before operation of ice protection device. This could be useful in ice protection device repair or replacement on aircraft components.

Z-CNT loaded adhesive 18 is prepared by infiltrating PSA 19 with Z-CNTs 20. PSA 19 can be infiltrated with Z-CNT through application of Z-CNTs 20 on a carrier substrate to the surface of PSA 19 to transfer Z-CNTs to PSA while keeping the same vertical alignment. (Z-CNTs can be grown on or transferred to a carrier substrate as needed). Z-CNTs can be transferred from the substrate onto PSA 19 via rolled lamination, gravity lamination, or other appropriate methods as known in the art. Alternatively, Z-CNTs can be introduced into PSA 19 when PSA 19 is being initially manufactured and prepared.

When applied, Z-CNTs 20 will micro-scale infiltrate PSA 19, with more Z-CNTs resting on the top surface of PSA 19. Z-CNTs can be applied to one or both sides of PSA 19 prior to adhesion of heater 22 to aircraft component surface 14. Z-CNTs should be evenly added to PSA 19 to avoid uneven melting when Z-CNT loaded adhesive 18 is later de-bonded. Generally, Z-CNTs should be less than 50% by weight of Z-CNT loaded adhesive 18 so as not to interfere with the integrity and adhesive strength of PSA 19.

Heater 22 is an ice-protection device for an aircraft component. Heater 22 contains structural layers 24, heating element 26, and electrical connections 28. Heater 22 is designed to prevent ice formation on an aircraft component surface. In heater 22, heating element 26 is supported by structural layers 24 and connected to a power source via electrical connections 28. Heater 22 is one example of an ice protection device. Alternatively, heater 22 can be instead a pneumatic de-icer, a different version of an electrothermal de-icer, or other ice protection devices.

Heater 22 is adhered to surface 14 via Z-CNT loaded adhesive 18. After alignment of Z-CNT loaded adhesive 18 and heater 22 with aircraft component surface 14, pressure is added as necessary to create the adhesive bond, generally with a hand roller to "wet out" the PSA.

When heater 22 needs to be removed from aircraft component 12 (for instance, for repair or inspection) or reposition in the initial installation, Z-CNT loaded adhesive 18 can be melted and allowing the heater and adhesive to be removed with ease as discussed in detail with reference to FIG. 7 below. In this case, Z-CNT loaded adhesive 18 is connected to a power supply. Current runs through Z-CNT loaded adhesive 18, and Z-CNTs 20 make Z-CNT loaded adhesive 18 increasing the temperature due to ohmic or joules heating and subsequently softens or melts. This weakens the bond strength of PSA 19, allowing for Z-CNT loaded adhesive 18 to be de-bonded and heater 22 to be separated from aircraft component 12. Different electrical configurations of Z-CNTs loaded in adhesive are discussed in more detail with reference to FIGS. 4-6 below.

Figure 2:
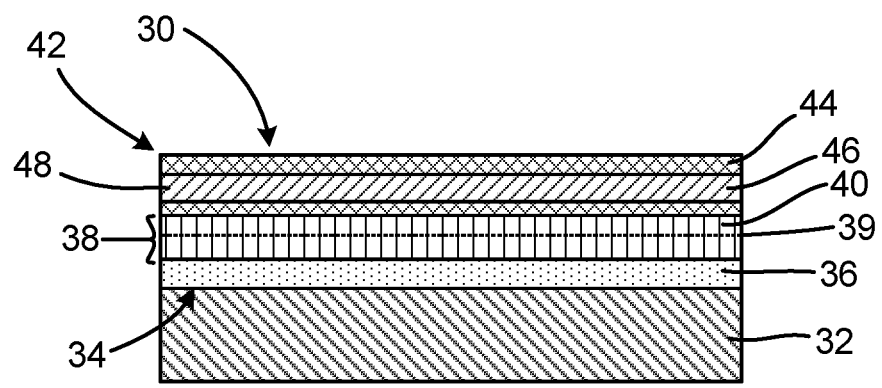
FIG. 2 is a schematic diagram is a schematic diagram of an ice protection assembly attached to an aircraft component with a Z-CNT loaded thermoplastic adhesive.

FIG. 2 is a schematic diagram is a schematic diagram of ice protection assembly 30 attached to aircraft component 32 with a Z-CNT loaded thermoplastic adhesive. Ice protection assembly 30 includes aircraft component 32 with surface 34, primer 36, Z-CNT loaded adhesive 38 (with thermoplastic adhesive 39 and Z-CNTs 40), and heater 42. Assembly 30 is similar to assembly 10 in FIG. 1. As such, only differing components will be discussed in depth.

In assembly 30, Z-CNT loaded adhesive 38 contains a dry thermoplastic adhesive 39 and Z-CNTs 40. Thermoplastic adhesives are polymer-based adhesives. Thermoplastic adhesive 39 can be, for example, hot melt adhesive. Z-CNTs 40 can be introduced into thermoplastic adhesive 39 during initial preparation of thermoplastic adhesive 39. As with PSAs, the Z-CNTs 40 should not be more than 50% by weight of Z-CNT loaded adhesive 38 to maintain the integrity and strength of thermoplastic adhesive 39. The thermoplastic adhesive can be vinyl acetate, polyolefins, polyamides, polyester, polyurethane, or styrene based materials.

FIGS. 3A-3F are schematic diagrams of methods of Z-CNTs infiltration of an adhesive. FIGS. 3A-3F show de-icer 50, Z-CNTs 52, and adhesive 54. De-icer 50 is a pneumatic boot or propeller de-icer to which adhesive 54 will be applied. Z-CNTs 52, as described with reference to FIG. 1, are vertically aligned carbon nanotubes infiltrating adhesive 54. Adhesive 54 can be, for example, a pressure sensitive adhesive as described with reference to FIG. 1, or a dry thermoplastic adhesive as described with reference to FIG. 2.

Figure 3A:
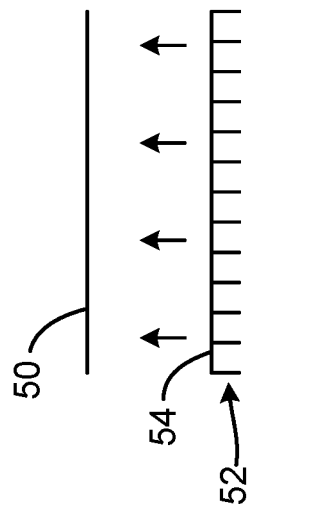
FIGS. 3A-3F are schematic diagrams of Z-CNTs infiltration of an adhesive.

FIG. 3A shows the Z-CNTs 52 applied first to a surface of de-icer 50. Z-CNTs 52 can be hosted on a substrate material when manufactured, and the substrate with Z-CNTs 52 can be applied to de-icer 50 while the outmost surface of the ice protection device is heat or solvent-softened. In this case, the substrate backing is peeled off after application of Z-CNTs 52 to de-icer 50. Subsequently, adhesive 54 is applied to the surface of de-icer 50 containing Z-CNTs 52. The Z-CNTs 52 lay between de-icer 50 and adhesive 54, but some of the Z-CNTs penetrate and infiltrate adhesive 54.

Figure 3B:
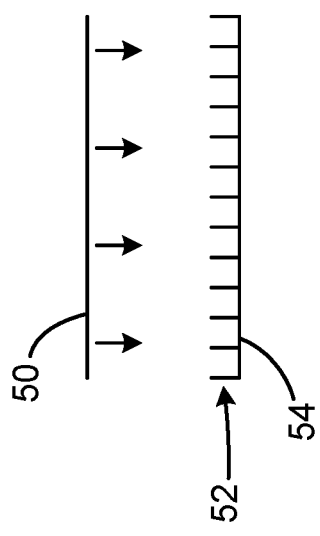
Figure 3C:
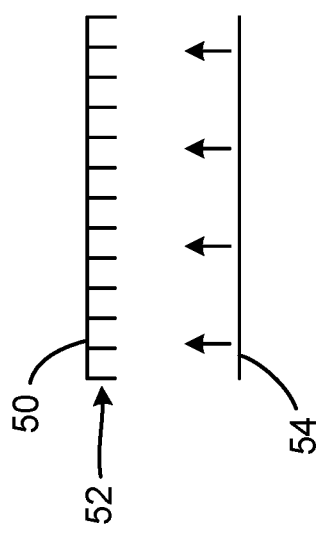

In contrast, FIG. 3B shows Z-CNTs 52 applied first to adhesive 54. In this case, Z-CNTs 52 on substrate is applied to a surface of adhesive 54. After adhesive 54 is infiltrates with Z-CNTs 52, adhesive 54 is applied to the surface of de-icer 50 with the Z-CNT side of the adhesive facing de-icer 50. Similarly, FIG. 3C shows adhesive 54 with Z-CNTs 52. However, in FIG. 3C, Z-CNTs 52 are applied to the opposite surface of adhesive 54. This allows for strong adhesive to de-icer 50.

Figure 3D:
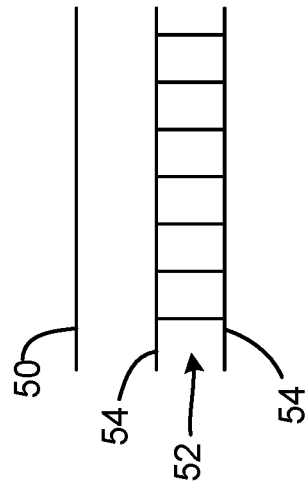
Figure 3E:
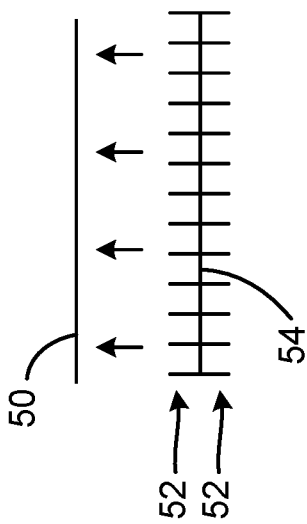
Figure 3F:
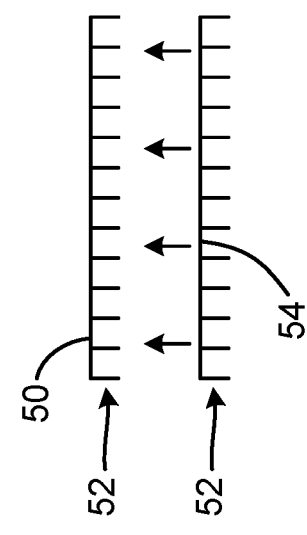

FIG. 3D shows Z-CNTs 52 applied to both de-icer 50 and adhesive 54. This allows for more extensive infiltration of Z-CNTs through adhesive 54. The embodiment in FIG. 3E also has this effect, but accomplishes it by applying Z-CNTs 52 to both side of adhesive 54. In contrast, FIG. 3F shows the use of two adhesive 54 with Z-CNTs 52 applied between the adhesives 54.

Figure 4:
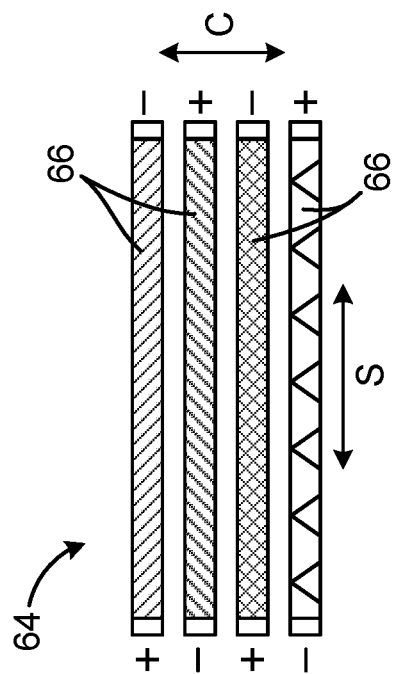
FIGS. 4-6 are schematic diagrams of Z-CNT infiltrated adhesives in varying embodiments.
Figure 5:
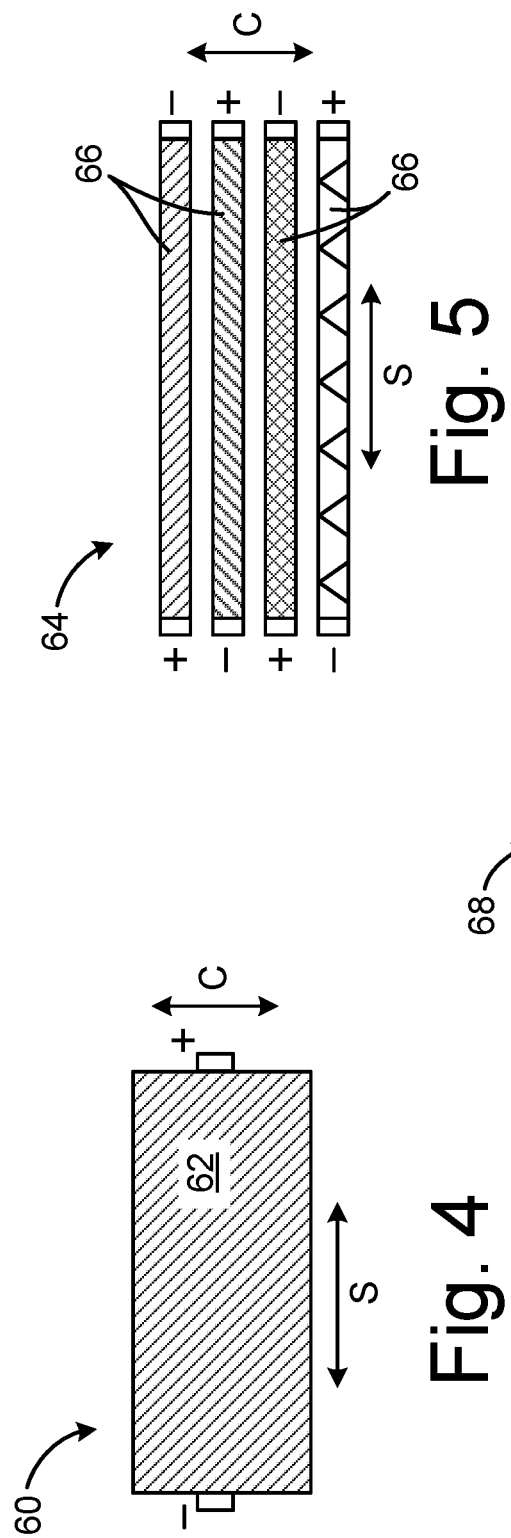
Figure 6:
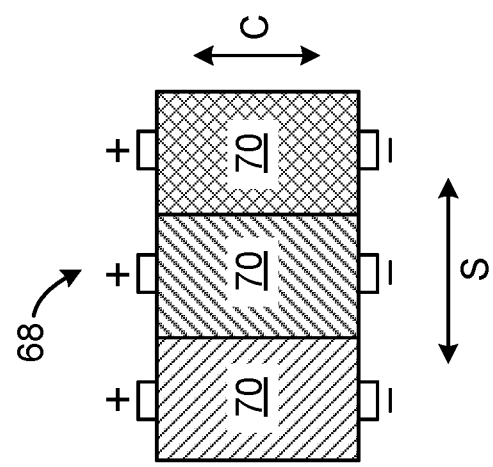

FIGS. 4-6 are schematic diagrams of Z-CNT infiltrated adhesives in varying electrical configurations. In each configuration, positive (+) and negative (−) terminals are shown where the Z-CNT infiltrated adhesive is connected to an outside electrical source through normal means known in the art, such as wires or metal traces.

FIG. 4 shows a Z-CNT infiltrated adhesive 60 having one large Z-CNT section 62. Here, the adhesive is one piece, all of which is evenly infiltrated with Z-CNTs. In contrast, FIGS. 5 and 6 show adhesive with multiple sections or pieces, each section infiltrated with Z-CNTs. FIG. 5 shows section 64 numerous spanwise (S) zones 66, each having adhesive and Z-CNTs. The spanwise Z-CNT infiltrated adhesive 66 can all contain the same amount of Z-CNTs, or differ depending on the typical needs for adhesive removal or replacement. Similarly, FIG. 6 shows Z-CNT infiltrated adhesive 68 with chordwise (C) sections 70. Each section 70 can contain the same amount of Z-CNTs, or differing amounts.

In each of the embodiments discussed with reference to FIGS. 4-6, an electrical current can be applied to the Z-CNT infiltrated adhesive at the terminals (+, −) to activate Z-CNTs within the adhesive. Because Z-CNTs are electrically conductive, application of current through the Z-CNT infiltrated adhesive heats the adhesive and allows for softening or melting.

The heating of Z-CNTs is based on ohmic heating or joule heating. The power (heat generated) of a given Z-CNT layer is dependent on the Equation below, where V is Voltage, R is resistance, and P is heat:

$$V^2/R=P$$

The zones of Z-CNTs in FIGS. 4-6 can be smaller zones dependent on the power/voltage source used. A readily accessible power supply, such as a power source used with a 120 VAC outlet or a Benchtop DC power supply is preferred. However, any voltage and power supply can be configured for use with the Z-CNT infiltrated adhesive, as long as the power supply has enough power to heat the adhesive to a softening range.

When the power/voltage source runs current through the Z-CNTs via the + and − terminals, the Z-CNTs conduct the heat to the adhesive. Thus, the power/voltage source can allow for an increase in temperature in the adhesive. This in turn softens or melts the adhesive, allowing for easy removal of adhesive sections containing Z-CNTs. In the case of smaller sections, as in FIGS. 5, 6, each section of Z-CNT infiltrated adhesive would them be removed by peeling, pulling, or scraping. This additionally allows for tailoring to adhesive removal: only section which need to be removed for repair or replacement need to be heated and removed. Depending on the size, it can be very difficult to remove an entire de-icer at once. So small sections are attacked at a time to make it easier. This also will be less likely to overheat areas that are not being worked on keep the power usage down.

The disclosed ice protection assembly requires less drying time compared to traditional liquid or chemical adhesives. Additionally, the Z-CNT filled adhesive is easier to remove. Overall, removal time and effort is reduced because of the meltable nature of Z-CNT filled adhesives. Solvents, or other adhesive removal steps, are avoided. Additionally, Z-CNTs strengthen adhesives in which they are loaded.

Discussion of Possible Embodiments

The following are non-exclusive descriptions of possible embodiments of the present invention.

An ice protection assembly includes an aircraft component having a surface, an adhesive on the surface of the aircraft component, wherein the adhesive is loaded with vertically aligned carbon nanotubes (Z-CNTs), and a heater attached to the aircraft component by the adhesive.

The ice protection assembly of the preceding paragraph can optionally include, additionally and/or alternatively, any one or more of the following features, configurations and/or additional components:

The aircraft component is selected from the group consisting of an airfoils, nacelles, nosecones, propellers, engine cowls, and leading edges.

The adhesive comprises a pressure sensitive adhesive.

The pressure sensitive adhesive is selected from the group consisting of include acrylates, silicones, nitriles, and styrenes.

The adhesive is a thermoplastic adhesive.

The thermoplastic adhesive is hot melt adhesive.

The Z-CNTs are no more than 50% by weight of the adhesive.

The assembly includes a primer on the surface of the aircraft component configured to increase adhesion of the adhesive on the surface.

A method of preparing an adhesive comprising infiltrating the adhesive with vertically aligned carbon nanotubes (Z-CNTs).

The method of the preceding paragraph can optionally include, additionally and/or alternatively, any one or more of the following features, configurations and/or additional components:

Infiltrating the adhesive comprises applying Z-CNTs from a substrate the adhesive Infiltrating the adhesive comprises mixing Z-CNTs into the adhesive.

A method of removing an adhesive from a component includes electrically connecting the adhesive to a power source, running voltage through the adhesive so that Z-CNTs in the adhesive heat and soften the adhesive, and removing the softened adhesive.

The method of the preceding paragraph can optionally include, additionally and/or alternatively, any one or more of the following features, configurations and/or additional components:

The Z-CNTs comprise no more than 50% by weight of the adhesive.

Removing the softened adhesive comprises scrapping, pulling, or peeling the adhesive off the component.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method of bonding an ice protection assembly to an aircraft component comprising:
    applying a primer on a surface of the aircraft component, wherein the primer is configured to increase adhesion of the adhesive on the surface;
    applying an adhesive on the primer on the surface of the aircraft component, wherein the adhesive is loaded with vertically aligned carbon nanotubes (Z-CNTs); and
    attaching a de-icer to the aircraft component by the adhesive.

2. The method of claim 1, wherein the aircraft component is selected from the group consisting of an airfoils, nacelles, nosecones, engine cowls, and leading edges.

3. The method of claim 1, wherein the adhesive comprises a thermoplastic adhesive.

4. The method of claim 3, wherein the thermoplastic adhesive is pressure sensitive adhesive, selected from the group consisting of include acrylates, silicones, nitriles, and styrenes.

5. The method of claim 3, wherein the thermoplastic adhesive is hot melt adhesive.

6. The method of claim 1, wherein the Z-CNTs are no more than 50% by weight of the adhesive.

7. The method of claim 1, wherein the de-icer is pneumatic de-icer or an electrothermal de-icer.

8. The method of claim 1, wherein the Z-CNTs are aligned at a 90 degree angle relative to the adhesive surface.

9. The method of claim 1, wherein the Z-CNTs are parallel to the adhesive surface.

10. A method of preparing an adhesive comprising infiltrating the adhesive with vertically aligned carbon nanotubes (Z-CNTs) and attaching to the adhesive at least one positive terminal and at least one negative terminal, wherein the one positive terminal and at least one negative terminal are configured to electrically connect the adhesive to a power source.

11. The method of claim 10, wherein infiltrating the adhesive comprises applying a substrate with Z-CNTs to the adhesive.

12. The method of claim 10, wherein the adhesive comprises a thermoplastic adhesive.

13. The method of claim 12, wherein the thermoplastic adhesive is pressure sensitive adhesive, selected from the group consisting of include acrylates, silicones, nitriles, and styrenes.

14. The method of claim 12, wherein the thermoplastic adhesive is hot melt adhesive.

15. The method of claim 10, wherein the Z-CNTs are no more than 50% by weight of the adhesive.

16. A method of de-bonding an adhesive from a component comprising:
    electrically connecting the adhesive to a power source;
    running voltage through the adhesive so that Z-CNTs in the adhesive heat and soften the adhesive; and
    removing the softened adhesive.

17. The method of claim 16, further comprising repositioning the adhesive.

18. The method of claim 17, wherein the Z-CNTs comprise no more than 50% by weight of the adhesive.

19. The method of claim 16, wherein removing the softened adhesive comprises scrapping, pulling, or peeling the adhesive off the component.

20. The method of claim 16, wherein the adhesive comprises a thermoplastic adhesive and the Z-CNTs are no more than 50% by weight of the adhesive.

* * * * *